United States Patent
Yokota et al.

(10) Patent No.: US 7,697,232 B2
(45) Date of Patent: Apr. 13, 2010

(54) STORAGE DEVICE AND STORAGE DEVICE CONTROLLER INCLUDING FEATURE FOR CAUSING THERMAL PROTRUSION PHENOMENON IN THE HEAD DURING STARTUP PERIOD OF DEVICE

(75) Inventors: Toshiyuki Yokota, Kawasaki (JP); Yoshiyuki Nagasaka, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 76 days.

(21) Appl. No.: 12/034,925

(22) Filed: Feb. 21, 2008

(65) Prior Publication Data
US 2008/0239551 A1    Oct. 2, 2008

(30) Foreign Application Priority Data
Mar. 26, 2007    (JP) .............................. 2007-078225

(51) Int. Cl.
*G11B 5/60* (2006.01)
(52) U.S. Cl. ........................................................ 360/75
(58) Field of Classification Search ...................... None
See application file for complete search history.

(56) References Cited

U.S. PATENT DOCUMENTS

| | | | | |
|---|---|---|---|---|
| 6,735,035 B1 * | 5/2004 | Smith et al. | .................... | 360/75 |
| 7,023,641 B2 * | 4/2006 | Doi et al. | ....................... | 360/68 |
| 7,027,251 B1 * | 4/2006 | Darragh et al. | ................. | 360/75 |
| 7,068,468 B2 | 6/2006 | Kamijima | | |
| 7,126,777 B2 * | 10/2006 | Flechsig et al. | ................ | 360/75 |
| 7,190,543 B2 * | 3/2007 | Suk | .............................. | 360/69 |
| 7,369,349 B2 * | 5/2008 | Satoh et al. | .................... | 360/75 |
| 7,375,914 B1 * | 5/2008 | Dieron et al. | .................. | 360/75 |
| 7,385,777 B2 * | 6/2008 | Satoh et al. | .................... | 360/75 |
| 7,426,089 B2 * | 9/2008 | Wada et al. | .................... | 360/75 |
| 7,457,067 B2 * | 11/2008 | Nagano et al. | ................. | 360/75 |
| 7,486,459 B1 * | 2/2009 | Schreck et al. | ................. | 360/31 |
| 7,486,465 B2 * | 2/2009 | Kondo | .......................... | 360/75 |
| 7,509,728 B1 * | 3/2009 | Schreck et al. | ................. | 360/75 |
| 7,525,752 B2 * | 4/2009 | Satoh et al. | .................... | 360/75 |
| 2005/0046985 A1 | 3/2005 | Morinaga et al. | | |
| 2006/0103981 A1 * | 5/2006 | Kiyono et al. | ............... | 360/126 |

(Continued)

FOREIGN PATENT DOCUMENTS

JP    A B2 2664447    6/1990

(Continued)

*Primary Examiner*—Hoa T Nguyen
*Assistant Examiner*—James L Habermehl
(74) *Attorney, Agent, or Firm*—Greer, Burns & Crain, Ltd.

(57) ABSTRACT

A storage device has a head that floats over a rotating storage medium. The storage device includes a measuring unit that measures the operating time and a head slider having a head element. The head element includes a reading element, a writing element and a heater, and a control unit that controls a protruding amount of the head element, by issuing an instruction causing an amount of power of a first predetermined value to be supplied to the heater until the amount of time measured by the measuring unit becomes a predetermined value. When the amount of time exceeds the predetermined value, the control unit cause an amount of power of a second predetermined value that is lower than the first predetermined value.

6 Claims, 7 Drawing Sheets

U.S. PATENT DOCUMENTS

2006/0209445 A1* 9/2006 Yamasaki et al. ............ 360/46
2006/0274455 A1 12/2006 Ishii et al.

FOREIGN PATENT DOCUMENTS

| JP | A 9-198829 | 7/1997 |
| JP | A 2003-168274 | 6/2003 |
| JP | A 2005-71546 | 3/2005 |
| JP | A 2006-338807 | 12/2006 |

* cited by examiner

STORAGE DEVICE AND STORAGE DEVICE CONTROLLER INCLUDING FEATURE FOR CAUSING THERMAL PROTRUSION PHENOMENON IN THE HEAD DURING STARTUP PERIOD OF DEVICE

BACKGROUND OF THE INVENTION

1. Field of the Invention

The present invention relates to a storage device that causes a head to float over a rotating storage medium and writes data, and to a storage device controller. In particular, the present invention relates to a storage device that controls the flying height of a head in a constant amount of time from the start of rotation of a storage medium such that the head reaches an appropriate flying height, and to a storage device controller.

2. Description of the Related Art

Conventionally, in storage devices represented by HDD (Hard Disk Drive), it has been necessary to lower the flying height of a head with respect to the recording surface of a storage medium such as a magnetic disk in order to realize high recording density. In recent years, a flying height of the extremely small order of 10 nm or less has been realized.

However, when the flying height of the head drops, it becomes easier for the head to collide with minute projections on the magnetic disk surface. Further, because variations in clearance per head are present within a mechanical tolerance range, there is the problem that, in consideration of medium contact, the flying height cannot be set low beyond the tolerance range.

Thus, a method of controlling the clearance between the head and the recording surface of the magnetic disk by installing a heater in the head and utilizing the protrusion phenomenon that results from the thermal expansion of the head floating surface accompanying the supply of power to the heater has been proposed (Japanese Laid-open Patent Publication No. 2003-168274).

Further, a method has been proposed where, as in Japanese Laid-open Patent Publication No. 2005-071546, the change in the protruding amount (TPR amount) resulting from a phenomenon (thermal protrusion: TPR) where the head floating surface protrudes in the direction of the magnetic disk is measured by testing or the like and retained in advance on the magnetic disk, and this data is used to manage the flying height per head.

However, adjustment of the head flying height by testing as disclosed in Japanese Laid-open Patent Publication No. 2005-071546 is performed on the basis of a state where the environmental temperature of the storage device has reached a stable or steady state. For that reason, in an environmental temperature during a transitional period until the environmental temperature reaches a steady state, such as immediately after startup of the storage device, the flying height of the head is not invariably an optimum flying height.

Figure 7:
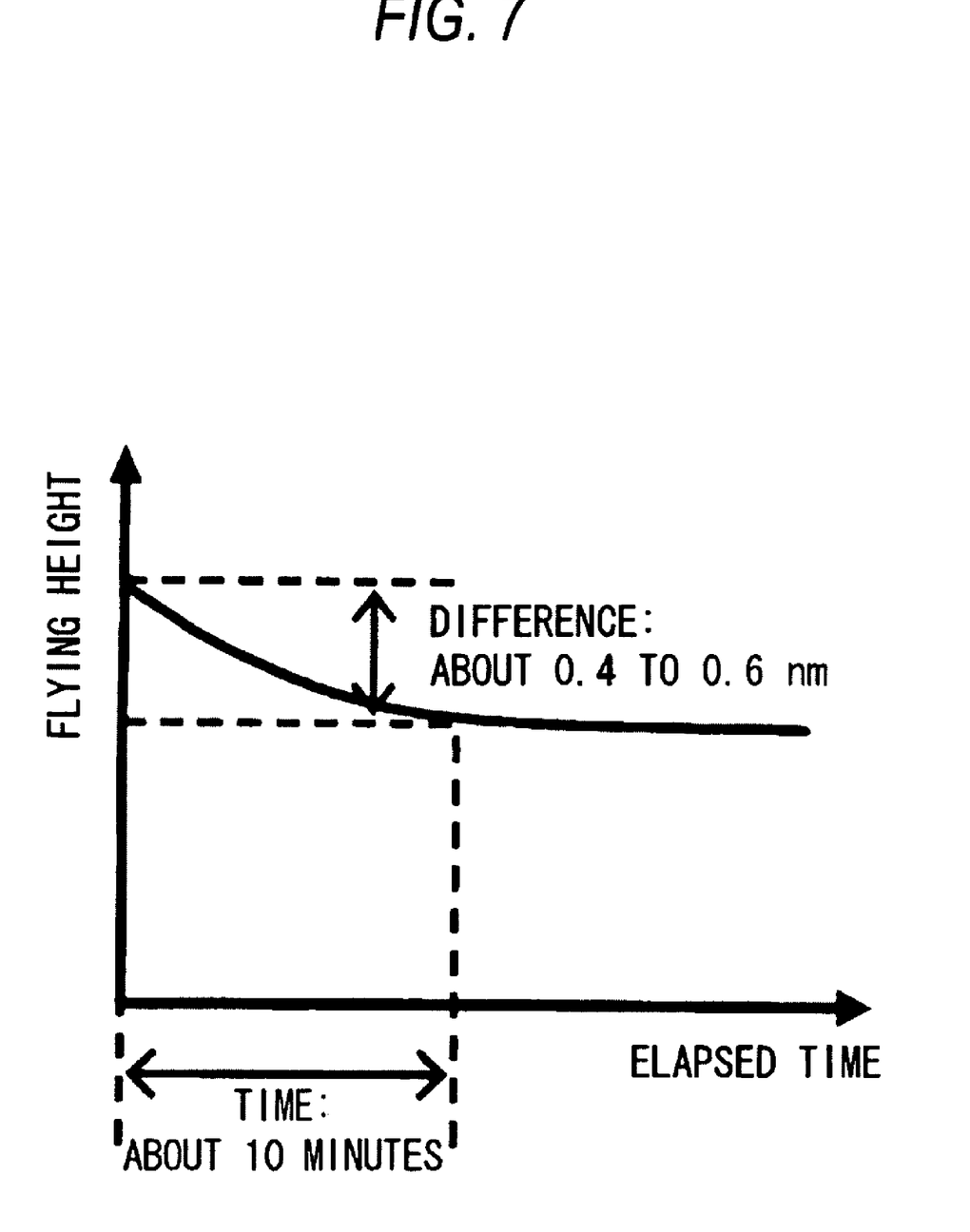
FIG. 7 is a diagram showing a change in the flying height of a head over time.

Usually, immediately after the storage medium disposed in the storage device begins rotating, such as when the power of the storage device is turned ON and the storage device begins operating, or when the power of the storage device is already ON and the storage medium resumes rotation after being stopped such as during a power saving mode, the environmental temperature of the storage device is lower than in the steady state. For that reason, the flying height of the head ends up being higher than the flying height in the steady state. For example, it is known that, as shown in FIG. 7, immediately after startup of a storage device, the flying height of the head is about 0.4 to 0.6 nm higher than the flying height in a steady state. Further, it is known that it takes about 10 minutes for the head to reach a state where it can operate appropriately at the value that has been preset at the design stage or during testing, that is, for the head to reach the steady state.

Further, with respect to changes in a short amount of time in the local environmental temperature in the vicinity of the head and the magnetic disk, it is also difficult to control the flying height using a temperature sensor because it is difficult to dispose a temperature sensor in the vicinity of the head or the like.

For that reason, within the amount of time until the storage device reaches the steady state immediately after startup, the flying height of the head is higher than in the steady state when the storage device is operated in a condition that has been appropriately set with respect to the steady state of the storage device. Due to this, the reading and writing characteristics of the storage device, and particularly the writing characteristic that is easily affected by the flying height, end up dropping. As a result, the storage device fails at writing and also fails at reading thereafter.

Thus, it is an object of the present invention to make the head fly at an appropriate flying height until the environmental temperature of the storage device reaches a steady state immediately after startup. It is also an object of the present invention to provide a storage device with greater reliability whose characteristics during reading and writing during this time are improved.

SUMMARY OF THE INVENTION

In accordance with an aspect of the present embodiment, a storage device includes a measuring unit that measures the operating time of the storage device, a drive unit that drives a storage medium to rotate, and a head slider. The head slider has a head element with a reading element that performs reading with respect to the storage medium. The head slider also has a writing element that performs writing with respect to the storage medium and a heater that causes the head element to protrude towards the storage medium, and a control unit that controls the protruding amount of the head element. The control unit issues an instruction causing an amount of power of a first predetermined value to be supplied to the heater until the amount of time measured by the measuring unit becomes a predetermined value. When the amount of time exceeds the predetermined value, the control unit issues an instruction that lowers the power supplied to the heater.

DETAILED DESCRIPTION OF THE PREFERRED EMBODIMENT

Figure 1:
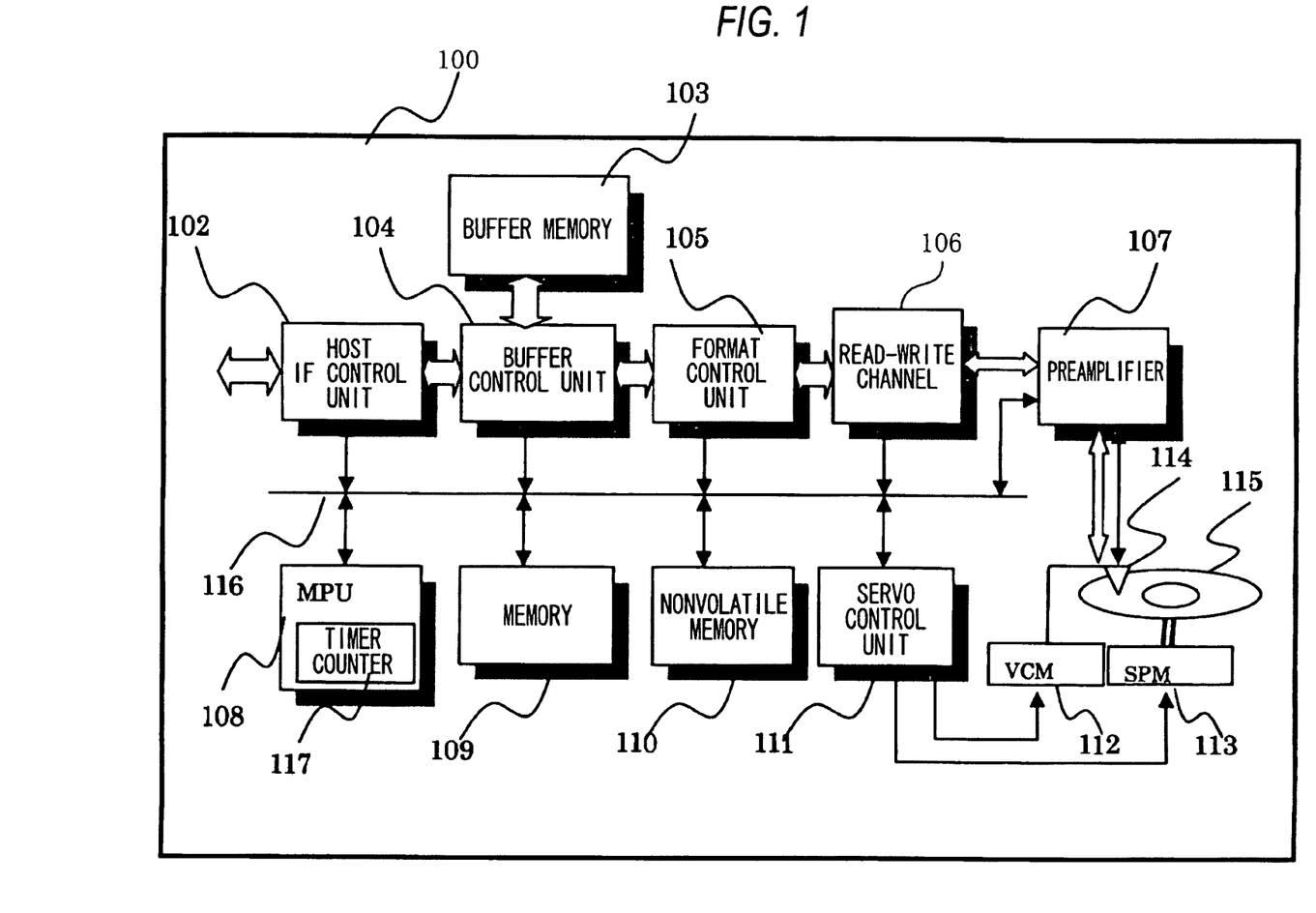
FIG. 1 is a block diagram of a HDD.

FIG. 1 is a control block diagram of a HDD 100. Turning now to FIG. 1, the HDD 100 is disposed with a host interface control unit 102 that controls a host interface connected to a host, a buffer memory 103 that stores data received from the host, and a buffer memory control unit 104 that controls the buffer memory 103.

The HDD 100 is also disposed with a format control unit 105 that performs ECC calculation and the like with respect to the received data, a read-write channel 106 that demodulates data that has been read and amplifies the data to a predetermined value, and Preamplifier 107 that controls output from a head 114. The HDD 100 writes data that has been received from the host to a storage medium 115 or reads data from the storage medium 115.

An MPU 108 is connected via a bus 116 to a memory 109 that stores control programs and control data and a nonvolatile memory 110 that stores control programs and the like.

The MPU 108 is also connected via the bus 116 to the aforementioned host interface control unit 102, the buffer memory control unit 104 that controls the buffer memory 103, and the read-write channel 106. A servo control unit 111 controls a voice coil motor (VCM) 112 and a spindle motor (SPM) 113.

Further, the MPU 108 is disposed with a timer counter 117 that is used when measuring the startup time of the HDD 100. The timer counter 117 is realized as a function of a program that operates on the MPU 108, for example. It will be noted that, in addition to being disposed in the MPU 108 as is shown, the timer counter 117 may also be realized as an independent circuit connected to the MPU 108 via the bus 116. It is also possible to use a timer counter of the host to which the HDD 100 is connected. That is, it is also possible to store, in the MPU 108 or the buffer memory 103, the value of a timer counter of which the HDD 100 is notified from the host and to use this as the timer counter.

It is also possible for the MPU 108, the memory 109, the host interface control unit 102, the buffer memory control unit 104 and the read-write channel 106 to be configured as one control device, such as an LSI device.

When the host interface control unit 102 receives a write command and write data from the host, the MPU 108 analyzes the contents of the write command and stores the write data in the buffer memory 103 as needed. Thereafter, the write data is converted into a predetermined data format by the format control unit 105, and an ECC code is added to the write data by ECC processing. Moreover, in the read-write channel 106, scrambling, RLL code conversion, and writing compensation are performed, and thereafter the write data is written to the magnetic disk 115 from a writing element of the head 114 via the Preamplifier 107.

At this time, a head positioning signal is applied to the servo control unit 111 from the MPU 108, and the voice coil motor 112 performs tracking control to seek a target track instructed by the command and place the head 114 on track.

When the host interface control unit 102 receives a read command from the host, the MPU 108 decodes the read command. Thereafter, a signal is read by a reading element of the head 114 via the Preamplifier 107 on the basis of the decoding result. Moreover, the signal that has been read is amplified by a preamp, inputted to a read demodulation system of the read-write channel 106, and demodulated as read data by partial response maximum likelihood (PRML) or the like. Moreover, the format control unit 105 performs ECC processing or the like to detect and correct errors, and the read data is buffered in the buffer memory 103. Thereafter, the read data is transferred to the host by the host interface control unit 102.

Figure 2:
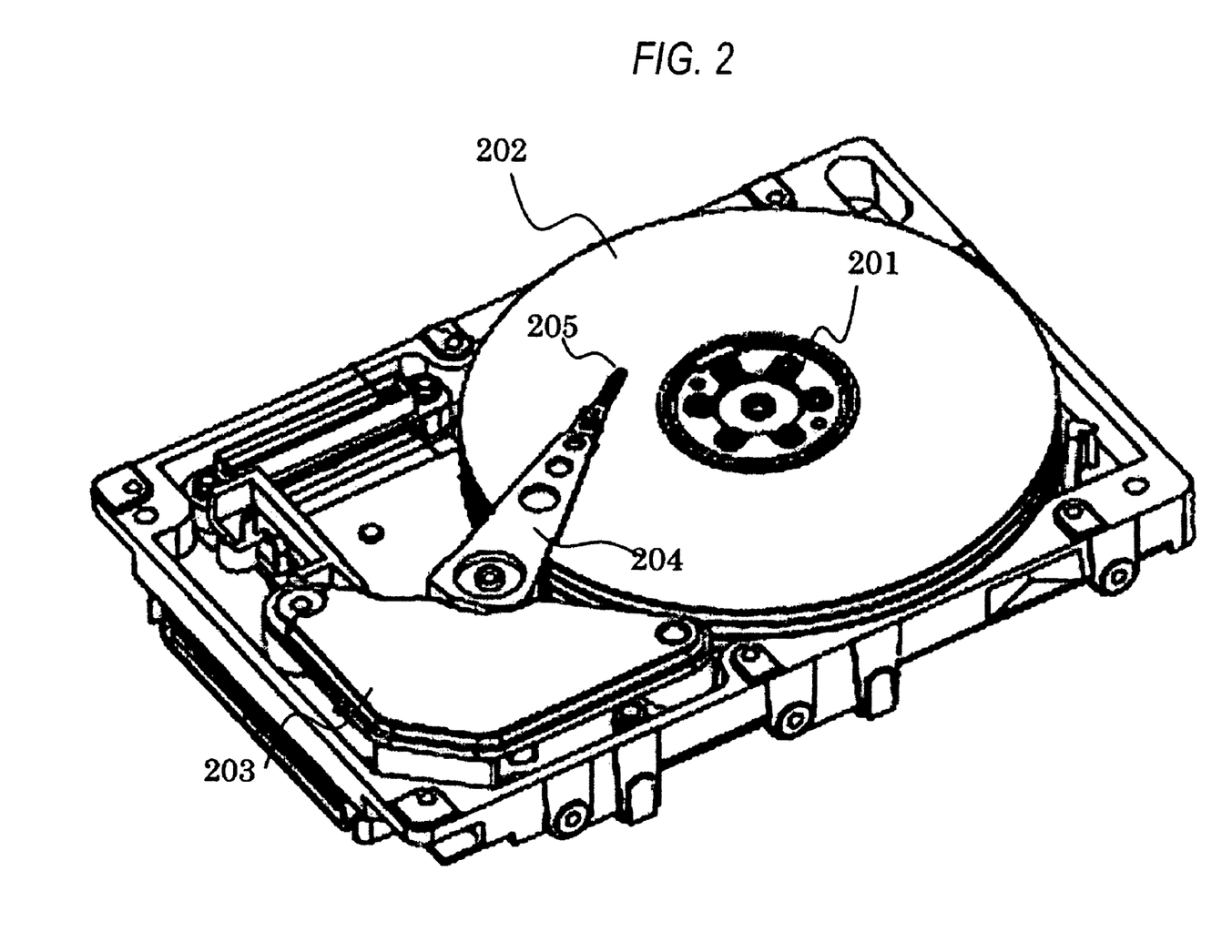
FIG. 2 is a general diagram of the inside of a casing of the HDD.

FIG. 2 shows the structure inside a casing of the HDD 100. A magnetic disk 202 that is rotated by a spindle motor 201 is incorporated in the HDD 100. A head actuator 204 that is driven by a voice coil motor 203 is disposed with respect to the magnetic disk 202. A head slider 205 is attached to the distal end of the head actuator 204.

Figure 3:
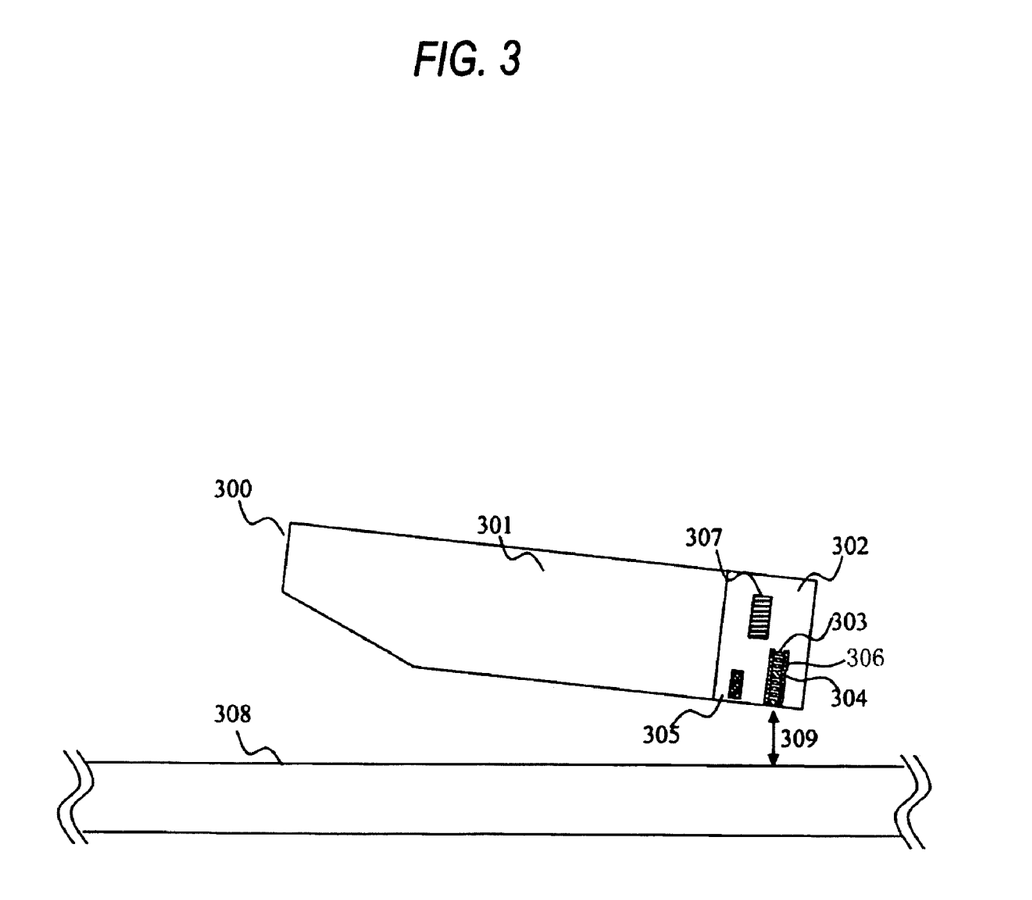
FIG. 3 is a cross-sectional diagram of a head slider.

FIG. 3 is a cross-sectional diagram of a head slider 300 of the present embodiment. The head slider 300 is configured from a head slider body 301 that is created by a ceramic material or the like such as aluminum titanium carbide and an element molded part 302 that is formed by alumina or the like. A writing element 306 comprising a write coil 303 and a recording core 304 is disposed in the element molded part 302. A reading element 305 is disposed adjacent to this writing element 306. A giant magneto resistance (GMR) element or a tunneling magneto resistance (TMR) element is used as the reading element 305.

Further, a heater 307 is disposed in the element molded part 302 in proximity to each element. An amount of power predetermined on the basis of an instruction from the MPU 108 is supplied to the heater 307 to heat the heater 307, so that it is possible to cause the element portion comprising the writing element 306 and the reading element 305 to expand and protrude towards a magnetic disk 308. Here, a flying height 309 between the element portion and the magnetic disk 308 is defined as the distance from the lower end of the writing element 306 to the magnetic disk 308.

Figure 4A:
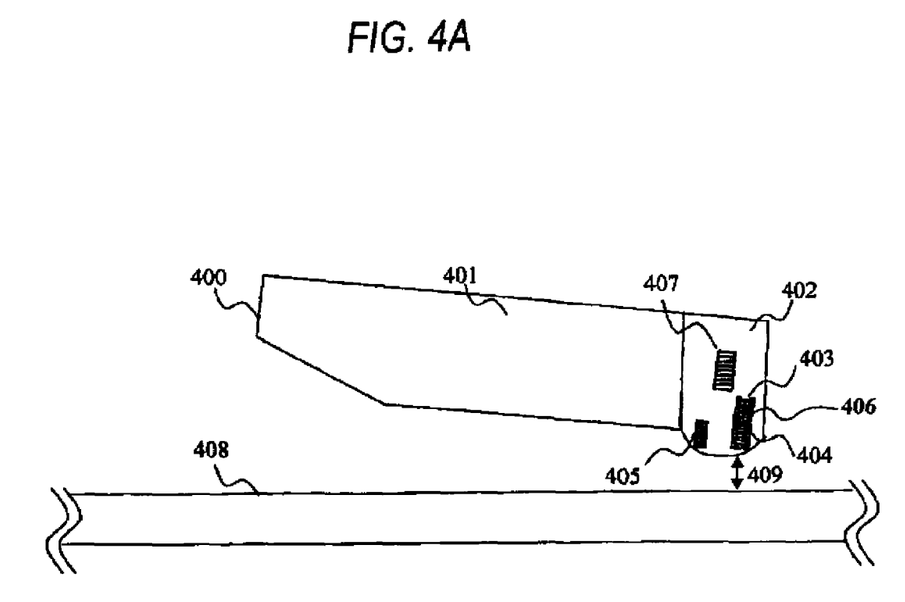
FIG. 4A is a cross-sectional change diagram of the head slider when power is supplied to a heater.
Figure 4B:
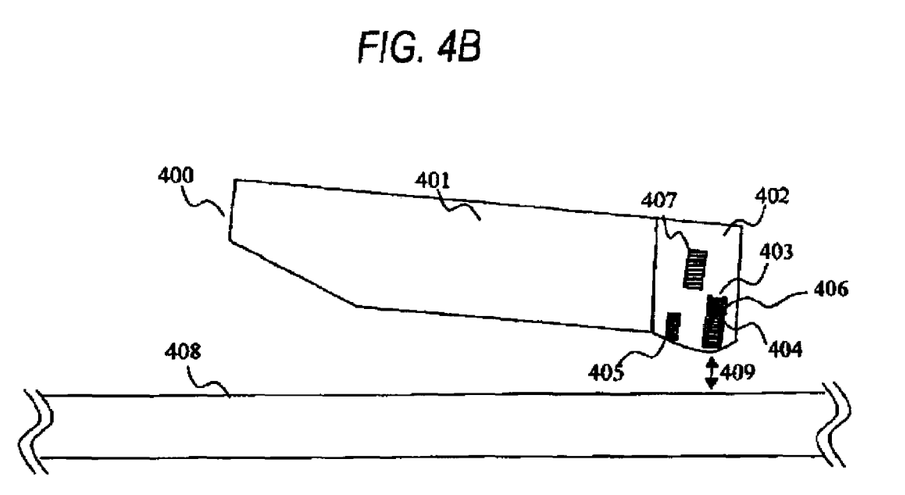
FIG. 4B is a cross-sectional change diagram of the head slider when power is supplied to a write coil.

Next, the protruding state of the element portion of the head slider will be described using FIG. 4A and FIG. 4B. When power is supplied to a heater 407, as shown in FIG. 4A, an element molded part 402 thermally expands because of the heat emitting action of the heater 407. For that reason, a reading element 405 and a writing element 406 disposed nearer to a magnetic disk 408 than the heater 407 protrude towards the magnetic disk 408. As a result, a flying height 409 drops, so the writing and reading characteristics with respect to the magnetic disk 408 are improved and the occurrence of errors is reduced.

Further, even when power is supplied to a write coil 403, the element molded part thermally expands because of the heat emitting action from the coil. For that reason, as shown in FIG. 4B, the writing element 406 protrudes towards the magnetic disk 408. As a result, similar to the case shown in FIG. 4A, the flying height 409 drops, so the writing characteristic with respect to the magnetic disk 408 is improved and the occurrence of errors is reduced.

Here, there are two main types of ways to supply power to the writing element 406. One is by a writing current that is supplied during writing in order to generate a magnetic field necessary for writing. Writing is implemented with respect to the magnetic disk 408 by this powering. It will be noted that the value of the writing current is a constant value during writing. This value is set in advance to become optimum when writing is performed in a steady state by the storage device on the basis of test results during the design stage or during the testing stage at a factory. Additionally, this value is stored in a nonvolatile memory or a register inside the storage device.

The other is by supplying an overshoot current that temporarily supplies an electrical current value higher than the electrical current value that is supplied as the writing current prior to supply of the writing current. This is implemented in order to improve the writing characteristic in light of the fact that a slight temporal window is needed from when power begins to be supplied to the write coil 403 to until a magnetic field of a strength necessary for writing arises. Whichever way power is supplied to the write coil 403, protrusion of the writing element 406 such as shown in FIG. 4B occurs.

Figure 5:
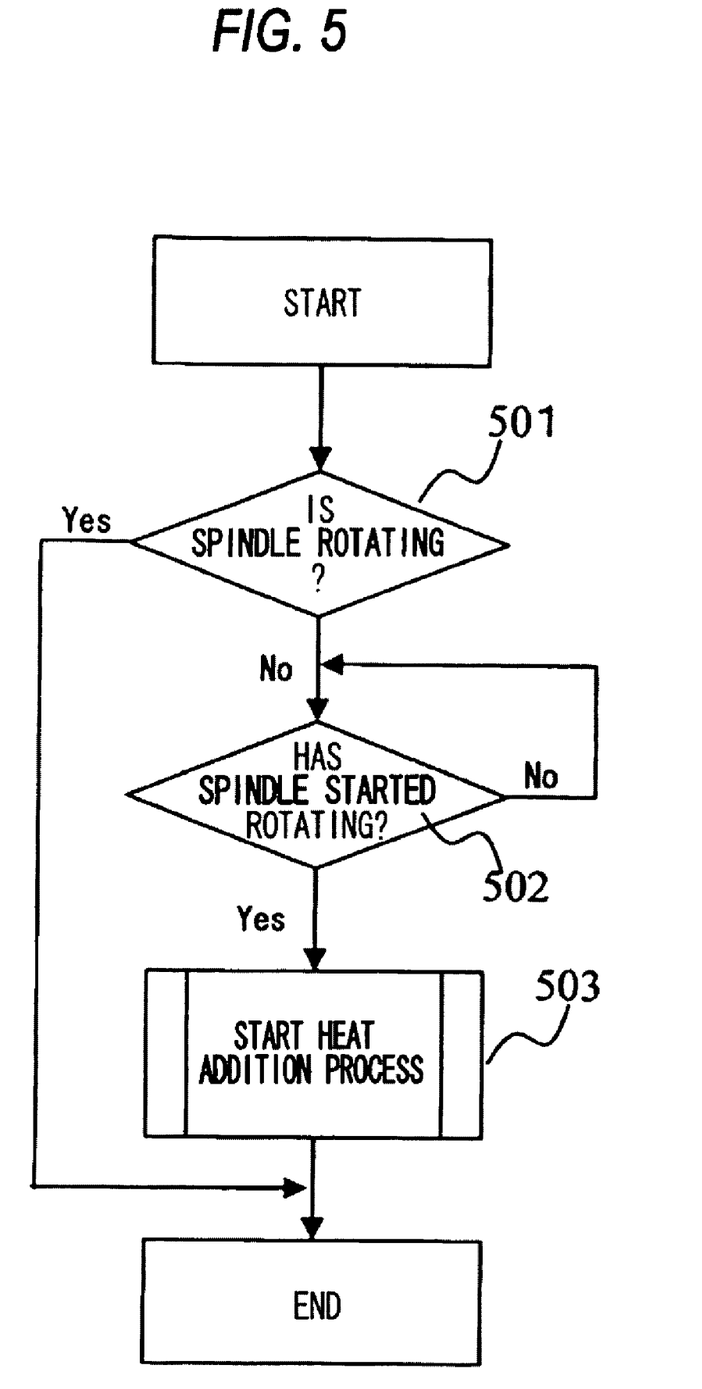
FIG. 5 is a flowchart of the startup of heat addition.
Figure 6:
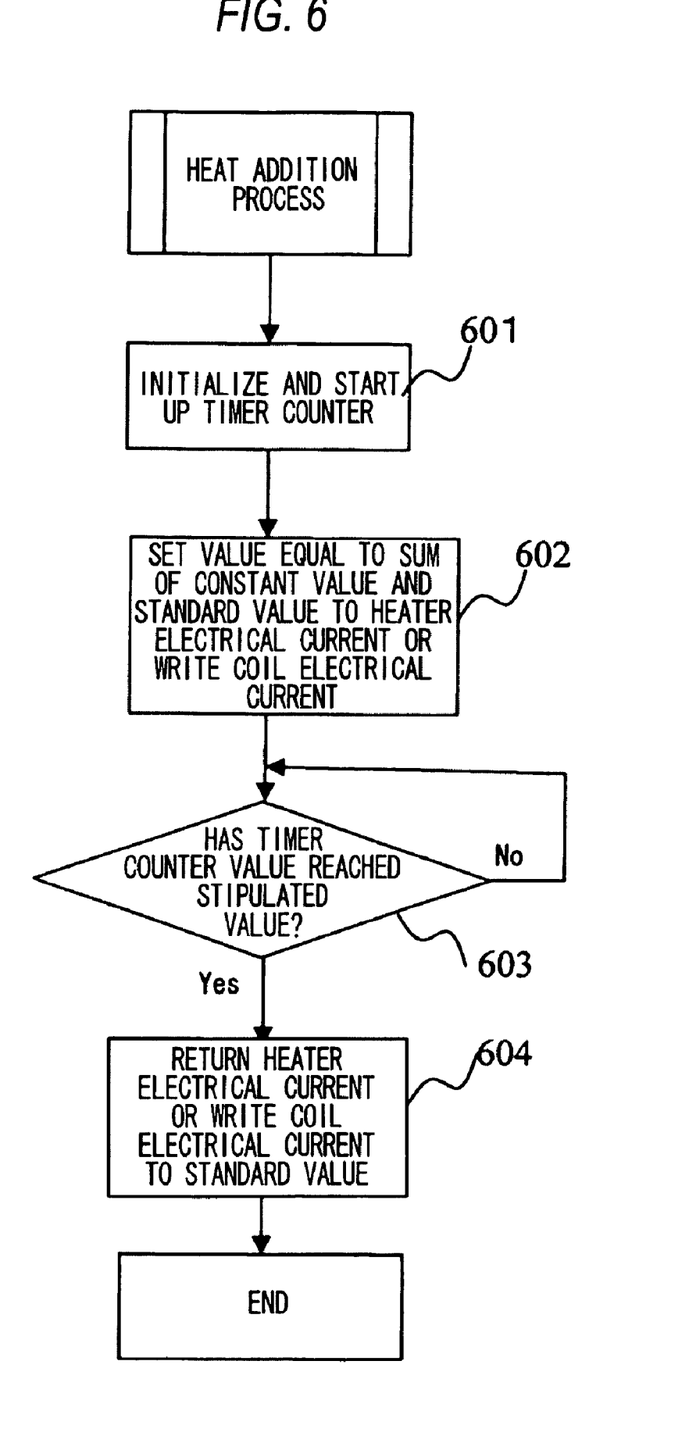
FIG. 6 is a flowchart of the heat addition.

In regard to the embodiment of the present invention, description will be given on the basis of the flowchart of the startup of heat addition shown in FIG. 5 and the flowchart of the heat addition process shown in FIG. 6.

When the magnetic disk disposed in the HDD 100 begins rotating, such as when the power of the storage device is turned ON or when the storage medium is instructed to resume rotation after being stopped such as during a power saving mode, the MPU 108 verifies the operating state of the spindle motor (S501).

When the spindle motor was in a stopped state (NO in S501), the MPU 108 judges whether the spindle motor has started rotating, and when the MPU 108 judges that rotation has begun (YES in S502), then the MPU 108 begins the later-described heat addition process (S503).

It will be noted that when the HDD is connected to a host via a small computer system interface (SCSI) and fibre channel (FC), the HDD receives a "start unit" command from the host, so it is also possible for the MPU 108 to start addition when the HDD receives this command. Similarly, when the HDD is connected to a host via a serial attached SCSI (SAS), the HDD sometimes also receives a "start unit notify" command in addition to the above-described command, so it is also possible for the MPU 108 to start the heat addition process when the HDD receives any of these commands. In this manner, the MPU 108 may start heat addition on the basis of a command from a host that is executed contemporaneously with the start of rotation of the spindle motor.

Here, by "addition" is meant processing that sets, over a predetermined amount of time taking as an opportunity the aforementioned factors, the amount of power to be supplied to the heater 407 and the write coil 403 higher than the amount of power that has been set to become appropriate in the steady state. That is, the MPU 108 adds, with respect to the amount of power in the steady state, the amount of power that causes a protruding amount of the head which corresponds to the difference between the flying height of the head immediately after startup of the HDD and the flying height of the head in the steady state.

Further, as a specific addition method, the MPU 108 may add the aforementioned adding amount to the electrical current value in the steady state and use this, or may store in advance in the HDD a value equal to the sum of the aforementioned value and the value to be used in the steady state and select and use that value. It will be noted that this addition is implemented by changing the value of a register or the like in which the electrical current value of the heater is set on the basis of an instruction from the MPU 108.

In accompaniment with this addition, the MPU 108 performs initialization to retain, in the memory, the timer counter value that the timer counter 117 at this processing time point represents or to again start the timer counter 117 after initializing the timer counter 117 (S601).

Next, the MPU 108 sets, as the value of the heater electrical current to be supplied to the heater, the value equal of the sum of the aforementioned predetermined value and the amount of power in the steady state (S602).

By adding the amount of power with respect to the heater 407 in this manner, the writing element 406 and the reading element 405 protrude towards the magnetic disk 408, so the writing characteristic and the reading characteristic can be improved.

Here, rather than performing addition with respect to the amount of power to be supplied to the heater 407, the MPU 108 may also perform addition with respect to the amount of power to be supplied to the write coil 403. The manner of addition is the same as the addition to the amount of power to be supplied to the heater 407.

That is, the MPU 108 may use, as the adding amount, the amount of power that causes the protruding amount of the head which corresponds to the difference between the flying height of the head immediately after startup of the HDD and the flying height of the head in the steady state and add this to the electrical current value to be supplied to the write coil 403 in the steady state. Here, the MPU 108 may add the aforementioned adding amount to the electrical current value in the steady state and use this. Further, the MPU 108 may store in advance in the HDD a value equal to the sum of the aforementioned adding amount and the value to be used in the steady state and select and use that value. This addition can be implemented by changing the value of a register or the like in which the electrical current value of the write coil 403 is set on the basis of an instruction from the MPU 108.

Further, as the manner of adding the amount of power with respect to the write coil 403 at this time, the MPU 108 may perform addition with respect to the writing current value to be supplied during writing or may perform addition with respect the overshoot current value to be supplied prior to writing.

In this manner, by performing addition with respect to the amount of power supplied to the write coil 403, the head protrudes around the writing element 406. For that reason, mainly the writing characteristic improves.

Here, when the overshoot current of the amount of power supplied to the write coil 403 is increased, it is possible to implement writing in a state where the writing element is protruding because of the overshoot electrical current. For that reason, it becomes possible to perform writing with the writing current value in the steady state, so it is possible to improve the writing characteristic in the period until the environmental temperature reaches the steady state with less power consumption. Of course, it is also possible to combine the above-described methods.

Next, the MPU 108 verifies whether, after the spindle motor of the HDD has started rotating or after receiving a specific command from the host issued when the HDD starts operating, an amount of time until the head is able to perform writing with the amount of power when the head flying height is in the steady state, such as 10 minutes for example, has elapsed (S603).

In regard to this verification method, the MPU 108 may periodically verify the timer counter value at constant time intervals, or may verify whether the timer counter value has become a value representing that the aforementioned amount of time has elapsed, or may verify whether the difference between the timer counter value and the value retained in the memory has become a value similarly representing that the aforementioned amount of time has elapsed. It will be noted that it is possible to appropriately change the time intervals at which the MPU 108 verifies the timer counter value in response to the operating status or load status of the HDD. Further, the HDD may also be configured such that an interruption notification comes up with respect to the MPU 108 when the constant amount of time elapses.

When the MPU 108 verifies that the predetermined amount of time has elapsed by the aforementioned method (YES in S603), then the MPU 108 changes the amount of power supplied to the heater 407 or the write coil 403 to the amount of power in the steady state (S604). In regard to this changing also, similar to the case of S601 mentioned previously, the value after being changed is set in the register or the like.

Further, in the present embodiment, the set value corresponding to the elapsed time was described using two values which are a value appropriately set in the steady state and a value set high by adding a constant value thereto, but it is also possible to prepare three or more set values corresponding to elapsed time to more finely control the HDD.

Because of the above method, the flying height of the head slider can be made into an appropriate value even during a period where the environmental temperature is different than in the steady state, such as immediately after startup of the HDD. And, the flying height of the head slider can be made into an appropriate value without the need to perform any special operation even in the steady state. For that reason, it becomes possible to better reduce the occurrence of errors during the writing of data with respect to the magnetic disk. As a result, it becomes possible to improve the reliability of the storage device.

What is claimed is:

1. A storage device having a storage medium comprising:
   a measuring unit that measures the operating time of the storage device;
   a drive unit that drives the storage medium to rotate;
   a head slider having a head element comprising a reading element that performs reading with respect to the storage medium and a writing element that performs writing with respect to the storage medium and a heater that causes the head element to protrude towards the storage medium; and
   a control unit that controls the protruding amount of the head element,
   wherein the control unit issues an instruction causing an amount of power of a first predetermined value to be supplied to the heater until the amount of time measured by the measuring unit becomes a predetermined value, and when the amount of time exceeds the predetermined value, the control unit issues an instruction causing an amount of power of a second predetermined value that is lower than the first predetermined value to be supplied to the heater,
   wherein the control unit issues the instructions on the basis of an amount of elapsed time from the start of operation of the drive unit that drives the storage medium to rotate.

2. A storage device having a storage medium comprising:
   a measuring unit that measures the operating time of the storage device;
   a drive unit that drives the storage medium to rotate;
   a head slider having a head element comprising a reading element that performs reading with respect to the storage medium and a writing element that performs writing with respect to the storage medium and a heater that causes the head element to protrude towards the storage medium; and
   a control unit that controls the protruding amount of the head element,
   wherein the control unit issues an instruction causing an amount of power of a first predetermined value to be supplied to the heater until the amount of time measured by the measuring unit becomes a predetermined value, and when the amount of time exceeds the predetermined value, the control unit issues an instruction causing an amount of power of a second predetermined value that is lower than the first predetermined value to be supplied to the heater,
   further comprising a receiving unit that receives commands from a host to which the storage device is connected, wherein the control unit issues the instructions on the basis of an amount of elapsed time from a time of reception of a predetermined command received from the host.

3. A controller of a storage device using a head slider having a head element comprising a reading element that performs reading with respect to a storage medium and a writing element that performs writing with respect to the storage medium and a heater that causes the head element to protrude towards the storage medium,
   wherein the controller issues an instruction causing an amount of power of a first predetermined value to be supplied to the heater until the operating time of the storage device of which the controller is notified becomes a predetermined value, and when the operating time exceeds the predetermined value, the controller issues an instruction causing an amount of power of a second predetermined value that is lower than the first predetermined value to be supplied to the heater,
   wherein the controller issues the instructions on the basis of an amount of elapsed time from the start of operation of a drive unit that drives the storage medium to rotate.

4. A controller of a storage device using a head slider having a head element comprising a reading element that performs reading with respect to a storage medium and a writing element that performs writing with respect to the storage medium and a heater that causes the head element to protrude towards the storage medium,
   wherein the controller issues an instruction causing an amount of power of a first predetermined value to be supplied to the heater until the operating time of the storage device of which the controller is notified becomes a predetermined value, and when the operating time exceeds the predetermined value, the controller issues an instruction causing an amount of power of a second predetermined value that is lower than the first predetermined value to be supplied to the heater,
   wherein the controller issues the instructions on the basis of an amount of elapsed time from a time of reception of a predetermined command received from a host.

5. A method for controlling a storage device including a head slider having a head element comprising a reading element that performs reading with respect to a storage medium and a writing element that performs writing with respect to the storage medium and a heater that causes the head element to protrude towards the storage medium, the method comprising the steps of:
   issuing an instruction causing an amount of power of a first predetermined value to be supplied to the heater when the storage device is started up; and
   issuing an instruction causing an amount of power of a second predetermined value that is lower than the first predetermined value to be supplied to the heater when the operating time of the storage device exceeds a predetermined value,
   wherein the operating time is an amount of time from the start of operation of a drive unit that drives the storage medium to rotate.

6. A method for controlling a storage device including a head slider having a head element comprising a reading element that performs reading with respect to a storage medium and a writing element that performs writing with respect to the storage medium and a heater that causes the head element to protrude towards the storage medium, the method comprising the steps of:
   issuing an instruction causing an amount of power of a first predetermined value to be supplied to the heater when the storage device is started up; and issuing an instruction causing an amount of power of a second predetermined value that is lower than the first predetermined value to be supplied to the heater when the operating time of the storage device exceeds a predetermined value, wherein the operating time is an amount of time from a time of reception of a predetermined command received from a host.

* * * * *